Figure 1:
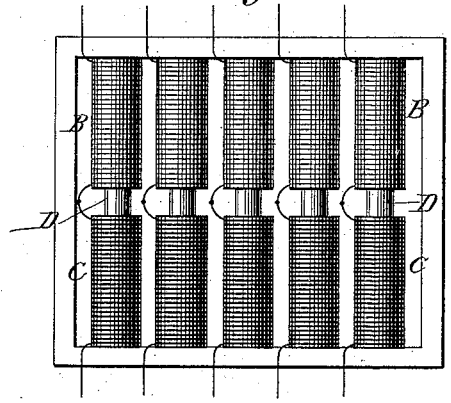

(No Model.)

E. WESTON.
ELECTRICAL COIL AND CONDUCTOR.

No. 381,304.   Patented Apr. 17, 1888.

WITNESSES:
Raymond F. Barnes
J. Daniel Compton

INVENTOR
Edward Weston
BY
Parker W. Page.
ATTORNEY

UNITED STATES PATENT OFFICE.

EDWARD WESTON, OF NEWARK, NEW JERSEY.

ELECTRICAL COIL AND CONDUCTOR.

SPECIFICATION forming part of Letters Patent No. 381,304, dated April 17, 1888.

Application filed October 13, 1885. Renewed June 18, 1886. Again renewed December 14, 1887. Serial No. 257,905. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Electrical Coils and Conductors, of which the following is a specification, reference being had to the drawings accompanying and forming a part of the same.

There are a great many electrical devices containing long lengths of conductor, usually in the form of coils or in convolutions, through which in the use or application of the instrument the current is passed, and in which it is desirable, and often extremely important, to preserve a constant or uniform resistance. This is frequently a matter of the greatest difficulty, inasmuch as a strong current is apt to raise the temperature of the conductor, and this, at least with all metallic conductors heretofore used, operates to increase its resistance. In fact, the resistance of all such instruments varies with the temperature of the coils or conductors, to whatever cause such variation in temperature may be due. Among the instruments which are injuriously affected by this property of conductors may be mentioned rheostats, artificial resistance, regulators, electrical meters, indicators, or testing instruments generally which are connected with a circuit or a branch thereof for determining the strength of a current or the potential at any point in a circuit. It is evident that a remedy for this is extremely desirable, as it would add greatly to the value and efficiency of every instrument to which it is applied.

I am enabled to provide such a remedy by availing myself of the discoveries I have made, that the metal manganese imparts a very high electrical resistance to alloys into which it enters, and has the further remarkable property of rendering the electrical resistance of such alloys nearly or quite constant under varying temperature.

I have found that an alloy of copper and manganese or ferro-manganese is a conductor which does not vary in resistance under variations in temperature, and in another application I have shown the applicability and advantage of such an alloy for use in the construction of such instruments as I have named. I have, however, discovered another alloy the resistance of which is lowered by an increase in temperature—a property which belongs to no other metallic conductor, so far as I am aware. This property I utilize in making coils, helices, or the like for such instruments as should have a constant resistance under variable temperature, by making one part of the coil or helix of the said alloy and the other portion of German silver or some other of the ordinary metals. In such case the resultant resistance is constant, provided the change in the two parts of the coil be equal as well as opposite.

The alloy the resistance of which lowers with increase of temperature is composed of copper, manganese or ferro-manganese, and nickel. This may be used for one portion of a coil and copper or German silver for the other, so that should the coil be heated by a current or otherwise the changes of resistances in the two portions of the coil will neutralize each other. To secure an exact balance is a matter easily determined by adjustment of the lengths of the two portions of the coil, or by the relative proportions of the metals used in the alloy. I prefer to employ with German silver or copper an alloy containing from sixty-five to seventy parts of copper, twenty-five to thirty parts of ferro-manganese, and two and one-half to ten parts of nickel. I prefer to use the ferro-manganese in lieu of manganese pure, on account of its greater cheapness.

In the drawings I have shown various forms of coil to which the invention is advantageously applied.

Figure 1 represents a rheostat or artificial resistance. It may be of any convenient or common form, and contains a certain number of coils, B C, which are here shown as wound on or supported by bars or rods D D. The whole number of coils may be inserted in a given circuit in series, or any one or more pairs of them may be so inserted; but however the coils may be used, they are so arranged that one portion of the resistance-wire in circuit is of a metal or alloy that increases in resistance with a rise of temperature, while the other portion is of the alloy I have described above.

Under these conditions the changes in resistance in each portion are equal and opposite under similar conditions of temperature, so that the total resistance remains constant.

It is obvious that this invention is usefully applied only where a rise of temperature is likely to be caused by the action of a current, and where the radiation of heat is not such as to maintain the temperature even; hence it is applicable to coils containing several overlying convolutions, rather than to spirals or resistance-wires used in such exposed positions that they do not become sensibly heated.

Figure 2:
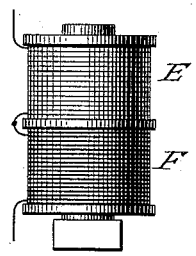
Figure 3:
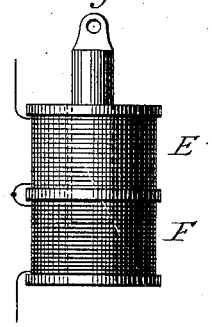
Figure 4:
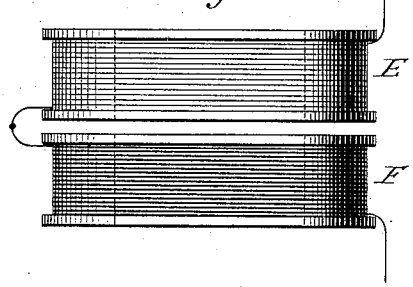

Fig. 2 is a form of magnet such as might be used in electrical regulators to preserve the resistance of the coils constant. They are made partly of one of the ordinary metals or alloys, such part being designated by the letter E, and partly of the alloy above described, represented at F. In this and all other cases it is obvious that each part or portion of the coil should be exposed to the same external conditions and should have the same chance of radiating heat. Therefore the two parts of the coil are wound side by side and not superposed. In like manner I construct a helix, as in Fig. 3, which may be used in a meter and indicator or the like, and also the coils of such instruments as galvanometers, Fig. 4. In these figures E designates the part of the coil or coils composed of the usual metals, and F that composed of the alloy of copper, manganese or ferro-manganese, and nickel.

What I claim is—

1. A conductor consisting of two metallic portions, one composed of a material the electrical resistance of which increases with an increase in its temperature, and the other composed of a material the electrical resistance of which decreases under similar conditions, as and for the purpose specified.

2. A conductor consisting of two metallic portions, one of which is composed of a material the electrical resistance of which increases with an increase in its temperature, and the other is composed of an alloy of copper, manganese or its equivalent, and nickel, as set forth.

3. A rheostat, resistance, or other electrical instruments of the kinds described, the conductors of which consist of two portions, one composed of a metal or alloy the electrical resistance of which increases with an increase in its temperature, the other of an alloy the resistance of which decreases under similar conditions, as set forth.

EDWARD WESTON.

Witnesses:
RICHARD WM. BLOEMEKE,
FRANK N. CRANE.